United States Patent Office 3,253,959
Patented May 31, 1966

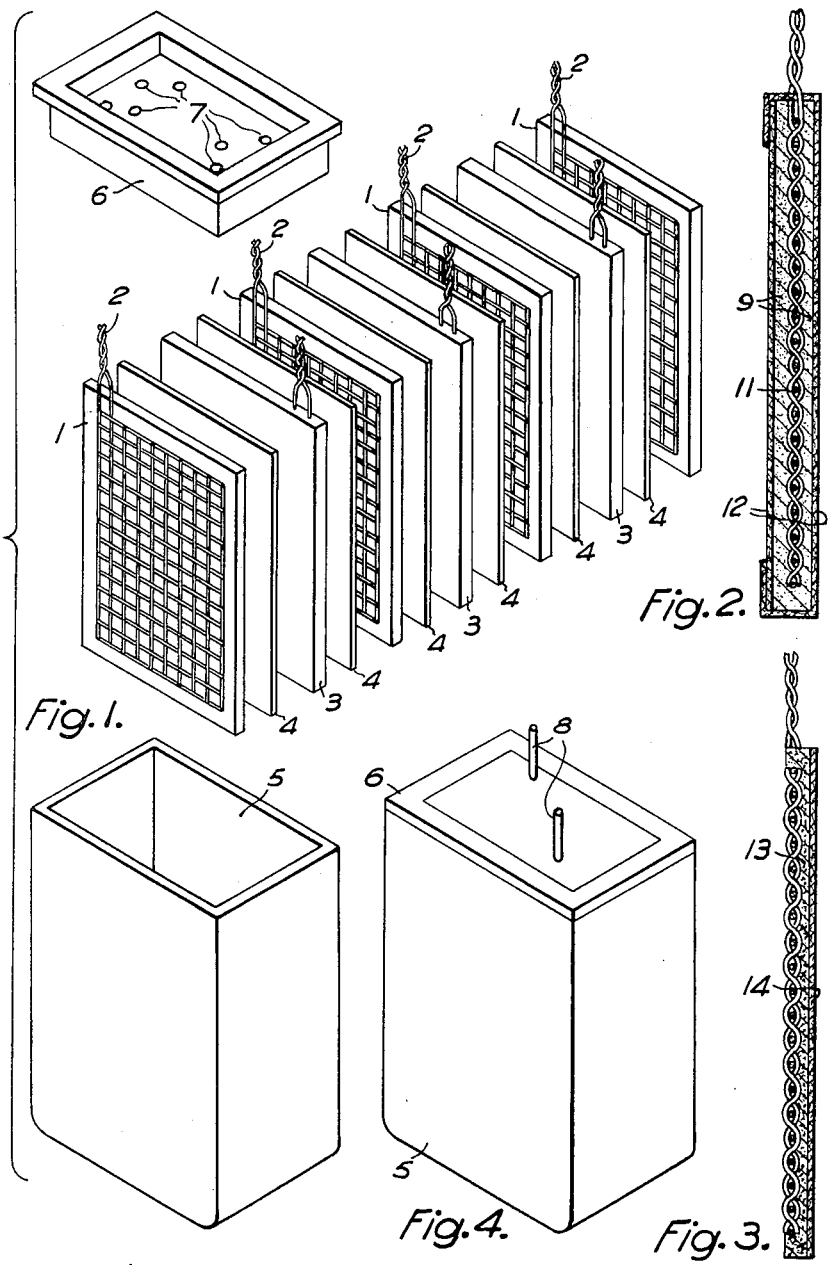

3,253,959
MERCURIC OXIDE-ZINC DRY BATTERY
Kenneth Jones, London, England, assignor to Burndept Limited, London, England, a British company
Filed Oct. 26, 1960, Ser. No. 65,234
Claims priority, application Great Britain, Oct. 26, 1959, 36,203/59
3 Claims. (Cl. 136—107)

This invention is concerned with the making of a cell of the zinc-mercuric oxide-caustic potash type capable of yielding a heavy current.

To obtain a heavy current the electrodes are made in the form of flat sheets, stacked close together with porous separators between them. It is preferable to have one more negative plate than positive, so that each positive plate lies between two negative plates. The positive plates consist of a sheet of metal gauze embedded in a mixture of carbon and mercuric oxide both in powder form, and the negative plates of zinc granules and starch wetted and coated on paper with metal gauze embedded in the coating. Separators are formed by wrappings or sheets of suitable caustic-alkali-resistant material. Alkali-resistant filter paper is one such material.

A typical construction of battery according to the invention is shown in the accompanying drawings;

FIG. 1 is an exploded view of the components of a cell,

FIG. 2 is a section through a positive electrode and

FIG. 3 a section through a negative electrode and

FIG. 4 a view of a complete cell.

From FIG. 1 it may be seen that there are four negative plates 1 with some wires 2 of their gauze foundation projecting at the left hand top corner, and three positive plates 3 with wires 2A projecting from the top right hand corner. Between the positive and negative electrodes are separators 4 shown as sheets independent of the electrodes. All these parts are assembled in close contact and placed in a container 5 made of rigid plastic, preferably of high impact polystyrene. The container is closed by a flanged and recessed lid 6. In this lid are individual holes 7 for the passage of the conductors 2 and 2A; outside the lid they are brought together by twisting or otherwise to form two terminals 8 seen in FIG. 4 and the recess in the lid is filled with suitable synthetic resin such as that sold under the registered trademark "Araldite." Binding screws or other forms of terminal may be added to suit the purpose for which the cell is intended.

The positive plate shown in section in FIG. 2 is made by applying a paste 9 of mercuric oxide and carbon black suitably damped to each side of a nickel wire mesh 11, the operation being done in a jig which determines the thickness of the applied layer.

Alternatively the positive plates may be made by spreading a layer of mercuric oxide, mixed with 5% by weight of carbon black and 8% by weight of water, in the cavity of a tableting press, placing on this a sheet of fine metal wire gauze, preferably of nickel, spreading another layer of the cathode mixture, and compressing.

It is also possible to form the electrode by extrusion in which case the paste may be made by adding a plastic binder instead of water.

The electrode may be wrapped in a suitable separator 12 which must be resistant to caustic alkali; this prevents fragments of paste dropping from the electrode and possibly short-circuiting the cell, and serves as a separator between positive and negative electrodes.

The negative plates are formed by spreading a mixture 13 of zinc granules, starch and water upon one side only of a sheet of filter paper 14 which is proof against the action of caustic alkali, drying them, and pressing a sheet of gauze upon the coated side. Or two such sheets may be assembled with their coated surfaces turned inward and a sheet of metal gauze between them. The gauze may be of amalgamated zinc, but for better pliability amalgamated copper or amalgamated tin-plated steel are preferable. This electrode also may be wrapped in an envelope of suitable material to provide for imbibing more electrolyte and to form a separator between adjacent positive and negative plates. Or independent sheets of separator may be inserted between the electrodes.

The plates are assembled in the plastic container 5, the wires 2 and 2A are passed through the holes 7 in the lid 6 which is cemented to the container. The wires of each sign are twisted together in the recess in the lid 6 which is then filled with Araldite. Electrolyte is added by a suitable method.

Alternatively the container may be fabricated from a suitable metal or alloy; the preferred material is nickel-plated mild steel. Wires from all plates of the same sign may be connected to screwed terminals passing through neoprene glands in the metal top of the container, and the top may then be welded on to seal the cell hermatically. However, a welding operation so close to the electrodes is undesirable; so even if the container is of metal the lid may be constructed of plastic as above described.

Where a metal container is used it may be made the positive terminal of the cell, in which case the envelopes of the negative electrodes must thoroughly insulate the electrodes from the container.

Evolution of gas occurs in the operation of the cell. It may be allowed to escape through a safety valve, or it may be permitted to bulge the container so giving visual warning of the condition of the cell.

I claim:

1. A dry battery capable of yielding heavy currents with stable potential comprising at least one positive and one negative plate, said positive plate comprising a sheet of nickel gauze embedded in a powder form consisting essentially of wetted carbon and mercuric oxide, said positive plate being covered with a paper separator, and said negative plate comprising a sheet of metal gauze embedded in a powder form of zinc granules and a wetted starch binder, and said negative plate being covered with paper.

2. A dry battery according to claim 1, in which a container is provided to receive the assembly of plates and separators, and a plate of plastic is provided to close a mouth of the container.

3. A dry battery according to claim 1, in which a container is provided to receive the assembly of plates and separators, and a plate of plastic is provided to close a mouth of the container, with connecting wires from several electrodes passing through individual holes in the plates and with the wires of one sign being joined together outside the plastic plate.

References Cited by the Examiner
UNITED STATES PATENTS

| | | | |
|---|---|---|---|
| 396,369 | 1/1889 | Roberts | 136—31 |
| 1,338,412 | 4/1920 | Xardell. | |
| 2,422,046 | 6/1947 | Ruben. | |
| 2,548,558 | 4/1951 | Raney. | |
| 2,708,683 | 5/1955 | Eisen | 136—20 |
| 2,739,179 | 3/1956 | Barrett | 136—30 |
| 2,829,189 | 4/1958 | Coleman et al. | 136—107 |

JOHN H. MACK, *Primary Examiner.*

JOHN R. SPECK, *Examiner.*

S. PARKER, J. CARSON, W. VANSISE,
*Assistant Examiners.*